Patented Sept. 26, 1950

2,523,316

UNITED STATES PATENT OFFICE 2,523,316

OINTMENT CONTAINING BENTONITE

William S. McClenahan and Harry A. Nelson, Pittsburgh, Pa., assignors to Chesebrough Manufacturing Company, Consolidated, New York, N. Y., a corporation of New York No Drawing. Application November 15, 1944, Serial No. 563,620

7 Claims. (Cl. 167—63)

This invention relates to water-removable ointments containing bentonite, water and a hydrophobic component such as petroleum jelly.

An existing practice is to employ fatty or greasy substances, such as lanolin, lard, partially hydrogenated oils such as cottonseed oil, and petroleum jelly, as an ointment for the skin, by adjusting the properties to a desirable softening range so that the material is plastic at body temperature and permits easy application.

By "ointment" is meant a substance of plastic nature which can be distributed over the skin, for example, by rubbing, and which can be employed for its own effects or as an agent for exhibiting medicinal or other materials.

Bentonites are inorganic hydrous silicates of aluminum, magnesium, or iron mutually interchangeable in the crystal lattice, along with alkali or alkaline earth metals, are of the clay family, and have the property of swelling in water to form a viscous hydrogel, in which the essential component may be one or more of the minerals montmorillonite, hectorite, nontronite, beidellite, or saponite. The bentonite here employed is preferably of the so-called northern or high sodium type, for the reason that these materials accept a greater proportion of the water to the arbitrary maximum of hydration (say, 8 or more times their own weight) as compared with the southern or high calcium types (which seldom accept 3 or 4 times their own weight in water). It has been found desirable to select bentonites which have ratios of acceptance of water to bentonite of 11:1 to 14:1, wherewith calcite and other impurities are regarded as inert fillers.

Bentonites are characterized by having the properties of taking up large quantities of water to form a gel and of yielding this water and returning essentially to the original state of a fine powder. In the presence of water, the bentonite is sometimes referred to as being "hydrated" but the water in a bentonite gel is apparently present under various conditions. Thus, the two-component mixture of bentonite and water contains "hydration" water, adsorbed water, and chemically combined water. Even commercially dry bentonite contains adsorbed water; and upon heating to 110 degrees C. for three hours, a weight loss of 5 to 7 percent occurred in samples tested, with a total loss up to 8½ percent upon heating in pans for several hours at about 160 degrees C., but the swelling power (corrected for loss of weight) was essentially unchanged and remained around 20 to 30 ml. Even dry sterilization at 170 degrees C. appears to have little effect upon the swelling power. The chemically combined water, however, appears intimately connected with the swelling power, and is lost upon heating to a minimum of about 550 degrees C., with production of a substance which no longer has the gel-forming properties of the original bentonite; thus upon heating the above samples to 600–700 degrees C., a further weight loss of 2 to 5½ percent occurred, and thereafter the swelling effect was only about 5 to 7 ml. The "hydration" water is associated in some way with the bentonite substances to provide a thixotropic gel. The quantities of water which are adsorbed or chemically combined, are relatively low in comparison to the weight of a bentonite gel; whereas the gel-producing water may vary in quantity over a very large range. For example, thixotropic properties have been reported in bentonite-water mixtures containing only a fraction of one percent of bentonite.

When it has been sought to employ bentonite as an ointment base in the presence of water, a thixotropic preparation has been distributed over the skin by rubbing. However, it immediately begins to dry and ultimately forms a cake or powder which may cause abrasion of the skin or may fall away and thus cease to perform any covering function. Hygroscopic substances such as glycerine have been added to prevent this loss of gel-producing water.

While bentonites are wetted by oils and greases, it is a characteristic of such bentonites that when used, without hydration, in admixture with petrolatum they provide bases of irregular appearance and even upon prolonged grinding or mixing it is almost impossible to produce a smooth consistency. During the course of such blending no stable union appears to be produced between the bentonite and petrolatum, and the material has the petrolatum present as the external phase. When water is mixed with such a composite, hydration is extremely difficult to obtain and a water-removable base cannot be had.

The swelling, gel-forming and emulsifying actions of various specimens of bentonite differ. In general, the original mixing of bentonite and water should occur at a pH above 7.0. When this condition is observed during the mixing, a later addition of 3 percent of acetic acid, for example, does not cause precipitation or any other effect than a minor softening: whereas, the addition of this same amount of acetic acid to the water, prior to mixing, prevents the formation of a gel.

In practical tests of commercial bentonites of high swelling power, it was found that when mixing dry Wyoming or North Dakota bentonite (e. g.

Volclay BC) into distilled water (pH 6.5), the pH rose rapidly to 9.5 at a bentonite concentration of one percent, and then gradually fell to 8.4 at a concentration of 15 percent. It is noteworthy that the pH of fluid suspensions of bentonites can usually be determined accurately and repeated tests give essentially identical values; but when the bentonite concentration is high enough to produce a gel, the accuracy is less certain. In practice, the values should be between about 7 and 9.5 for mixtures of bentonite and water, dependent upon the particular bentonite and the original pH of the water. The same bentonites demonstrated a viscosity, in a 5 percent mixture, of 74 seconds or more for 200 cc. to flow through an arbitrary capillary funnel which permitted passage of the same quantity of water in 59 seconds. Consistency and viscosity values are inverse; but it will be understood that viscosity measurements on fluid mixtures or "soft gels" may encounter difficulties by thixotropy. The consistency of the gels of these commercial bentonites at 20 percent concentration in water mixture could be adjusted from 156 to 400 or more units (tenths of millimeter penetration of standard cone in standard time), with changes of proportions from 30 down to 15 percent, in samples which had aged at least 16 hours before testing and with the high values indicating soft gels.

Bentonite-water mixtures have heretofore been used for preparing mixtures containing mineral oils, as an insecticide, in which the oils have been distributed or emulsified as oil-in-water emulsions because of the cheapness of water as a diluent and viscosity-reducing agent. This emulsion is then sprayed onto the plants, and evaporation begins and ultimately the dilution water is lost together with the gel-forming water of the bentonite, and the material is converted to a film having the oil as the external phase, whereby adhesion and water-proofness is attained so that the insecticidal material is no longer washed away by rain.

In prepared ointment bases, including the medicated ointments and cosmetic cold creams, the employment of fatty bases has led to compositions which likewise cannot be removed by water alone, but require organic solvent agents, detergents, or vigorous and even abrasive rubbing with absorbents such as porous tissue papers. Obviously such bases are not adapted for cases where danger to tissues may result from contact with solid objects or effective removing agents nor even for all dermal uses where the skin is unbroken, because often the necessary friction is painful.

Petroleum jelly, as compared with many unctuous bases, has the desirable characteristic of not forming a nutrient for organisms and of being easily prepared in a sterile condition. Its consistency may be easily modified and controlled, by blending petrolatums of different individual softening or melting points, wherewith to produce a mass having the desired range of softening temperature. However, its direct employment is accompanied by the difficulty that the petroleum jelly is not soluble in water and hence the applied ointment cannot be removed by any simple washing.

It has now been found that a material having the physical characteristics of a desired plasticity during application, of adhesion to the skin in the form of a flexible film, and of easy removal by water even after drying, can be produced by employment of properly selected proportions of water, bentonite and a fatty or greasy substance such as petroleum jelly. The composite material gives the unctuous tactile sensation of petroleum jelly itself and behaves during application in the manner of a very viscous emulsion of oil-in-water type. A very large part of water can be eliminated from the material without in any case causing a loss of the desired condition of accepting water again to permit water removability, as long as the material is present on the skin, and hence the ointment base is herein referred to as "permanently water-removable."

As a practical test of "water removability" the hands are washed well and a definitely washable or water-removable ointment containing a wetting agent such as sodium lauryl sulphate is applied and rinsed off, several times in succession. This treatment removes oils and other matters which might disturb the conditions of test. The ointment to be tested is then rubbed into the palms of the dried hands until no further cooling effect due to water evaporation is noted, and then rinsed off under warm running water while rubbing the palms together. A water-removable ointment, under this test, will leave the palms uniformly wetted with water after rinsing; while an incompletely removable ointment will leave a slight oily film which is only partially wetted with water. Successive tests may be made so long as the ointments are water-removable, but it is necessary to go through the preparative procedure again if an incompletely removable ointment is encountered.

When compounded with ingredients such as perfume, the ointment base forms a cold cream for cosmetic uses, and can be applied with a mild friction as compared with the more forceful rubbing often demanded for grease-base cosmetics. The evaporation of the cool water is sudden and the deposit has a dull surface as compared with the shiny appearance of many cosmetics having greasy bases.

A particular characteristic of the material according to the present invention is that the water in the bentonite-water mixture acts to confer the desired plasticity upon the material for presenting it in the desired condition for application: and that the compositions are so effective that a large part of this water may be eliminated by natural evaporation during and after application to the skin, but the bentonite operates to hold a part of the water and apparently to maintain with this water the external phase of an emulsion-type composition so that the permanent water removability is assured. A further characteristic is that the stability of the composition is such that a base containing as high as 70.4 percent of water can be prepared which does not freeze at 30 degrees F., and which can be heated in a tight container to temperatures as high as 250 degrees F. for 15 minutes or more for definite sterilization without thereby losing the characteristic of water removability following use. This characteristic of maintenance of essential properties is further exhibited in that the material exhibits essentially the same placticity over a wide range of temperatures such as from 40 degrees F. to 150 degrees F., being essentially the entire range of atmospheric temperatures at which cold creams or ointments would normally be applied to the skin. The mixtures have the characteristic of being capable of withstanding very low temperatures, at whitch the compositions become very hard: and of returning to their prior state upon re-warming. The freezing point of a particular mixture is determined by its composition, and depressants may be added to control this: thus a base containing 20 percent of propylene glycol can be extruded from a collapsible tube at minus 28 degrees C. (minus 18 degrees F.).

Compositions can be prepared which exhibit great stability and are essentially free from phase reversal even though subjected to repeated cycles of high and low temperatures, and the compositions are even stable at pasteurizing and sterilizing temperatures. Thus, Pyrex test tubes containing specimens are dipped into liquid propane (boiling point about minus 40 degrees F.) in a Dewar flask, allowing them to remain for some time after the propane boiling rate has resumed its normal slow character, then removing and warming to room temperature, and finally placing in an oven at 150 degrees F. At least two or three complete cycles are withstood before signs of petrolatum separation are noted. Obviously such a test is far more severe than the conditions normally experienced. Phase reversal under extreme conditions is first manifested, as among compositions of varying proportions, in those having the higher petrolatum content. Any checking or surface cracking of very old specimens can be dissipated by reworking the cracked product, whereby it is restored to essentially its original condition, provided that there has not occurred a grave loss of water: and even then can be reworked to original condition upon adding replacement water.

A characteristic feature of the ointment base is that the emulsifying agent (bentonite) is permanently insoluble in water and not liquefied by the selected water content regardless of the temperatures as bentonite has the properties of binding water yet not dissolving therein. Hydrated bentonite, regardless of the amount of water in which it is present, remains permanently in the gel state; whereas gelatin, agar, acacia, tragacanth, dextrine, and other organic colloidal emulsifying agents have critical temperatures, depending upon the amount of water present, above which they liquefy and lose their emulsifying properties. Present compositions have been found to have no critical temperatures within the range of minus 50 degrees F. to 250 degrees F., and this range includes all practical conditions under which the base is fabricated, sterilized, stored or used.

In preparing the composition of the present invention, illustrative basic ingredients are bentonite, petroleum jelly and water. This water is effective largely to produce a gel with the bentonite. Various bentonites are effective to produce such gels in varying proportions with respect to water, and it has been found that when the bentonite remains in contact with excess of water, ultimately an end-point of hydration is reached, since the hydrated bentonite does not go into solution in the water, but attains the condition of a rather fluid gel. This end-point will vary somewhat under differing conditions of test: and the results under the U. S. P. XII and A. S. T. M. tests are herein used as defining the behavior of various specimens. At points below this maximum proportion of water to bentonite, the material establishes a more or less plastic hydrophilic gel, and this gel exhibits strength conditions or consistencies representing viscosity, which depend upon the proportion of solids to water for the particular bentonite.

It has been found that when petroleum jelly is introduced into such a gel under such conditions that essentially homogenization occurs, the petroleum jelly, under the proper condition of concentration, becomes broken up into minute particles which are dispersed within the bentonite jelly. Under such conditions the ointment base may be spread upon a surface and a large part of its water content permitted to escape; but under the selected condition of concentration, the loss of this water is not accompanied by emergence of the petroleum jelly to form an external phase which would capsule or surround bentonite particles, and hence the material remains hydrophilic, even though vigorous mechanical rubbing has been employed and a great proportion of the water has been eliminated. This maintenance of the oil-in-water type of emulsion is further evidenced by the behavior of the material at high and low temperatures, as aforesaid.

It is notable that when bases are prepared from bentonite gel and petroleum, the consistencies of these two components are not additive in determining the consistency of the mixture. The consistency of the finished base more closely follows that of bentonite gel than the consistency of the added petrolatum. Table I indicates the properties of various compositions, and demonstrates the departure of the consistency as "found" from the "theoretical" consistency calculated on the basis of the proportions of ingredients of the stated consistency values. In this table, ratios of 90:10 and 70:30 bentonite gel: petrolatum were selected, with variations of the bentonite gel from 30 to 16 percent bentonite, and variations of petrolatum in consistency from 239 to 126.

*Table I*

| Individual Ingredients and Consistency Values | Ointment Consistency | | |
| --- | --- | --- | --- |
| | Found | Calculated | Per Cent Difference |
| Using 30% Bentonite gel: (Consistency 134)— | | | |
| (1) 90% gel / 10% petrolatum (239) | 125 | 145 | −14 |
| (2) 70% gel / 30% petrolatum (239) | 138 | 166 | −17 |
| (3) 90% gel / 10% petrolatum (195) | 139 | 140 | −0.7 |
| (4) 70% gel / 30% petrolatum (195) | 161 | 142 | +13 |
| (5) 90% gel / 10% petrolatum (126) | 124 | 133 | −6.8 |
| (6) 70% gel / 30% petrolatum (126) | 117 | 132 | −11 |
| Using 20% Bentonite gel: (Consistency 164)— | | | |
| (7) 90% gel / 10% petrolatum (203) | 162 | 168 | −3.6 |
| (8) 70% gel / 30% petrolatum (203) | 168 | 176 | −4.5 |
| (9) 90% gel / 10% petrolatum (195) | 165 | 167 | −1.2 |
| (10) 70% gel / 30% petrolatum (195) | 185 | 173 | +6.9 |
| (11) 90% gel / 10% petrolatum (126) | 158 | 160 | −1.3 |
| (12) 70% gel / 30% petrolatum (126) | 148 | 153 | −3.3 |
| Using 16% Bentonite gel: (Consistency 189)— | | | |
| (13) 90% gel / 10% petrolatum (239) | 188 | 194 | −3.1 |
| (14) 70% gel / 30% petrolatum (239) | 194 | 204 | −4.9 |
| (15) 90% gel / 10% petrolatum (195) | 188 | 190 | −1.1 |
| (16) 70% gel / 30% petrolatum (195) | 200 | 191 | +4.7 |
| (17) 90% gel / 10% petrolatum (126) | 181 | 183 | −1.1 |
| (18) 70% gel / 30% petrolatum (126) | 169 | 170 | −0.6 |

The consistency values of Table I were determined by A. S. T. M. method D–217–38T.

Examples 4, 10 and 16 are abnormal, apparently due to incomplete mixing of the selected petrolatum into the bentonite gel, but have been included to show that the consistency in no event is below that of the softer component or above that of the harder. In general, the results have greater uniformity when large quantities are mixed in large mixers. The results of Table I were obtained upon mixtures prepared by slabbing bentonite gel with petrolatum in the cold: comparison tests were also made by stirring the materials together as set out in specific Examples 1 to 3 hereafter, and the values thereof were found to agree with consistency values of identical compositions made by slabbing.

It is noteworthy that the difference between "calculated" and "found" consistencies is greatest when hard bentonite gel is mixed with a soft petrolatum, and this difference decreases down to mixtures of soft gel with a hard petrolatum. In general, a hard gel and a soft petrolatum tend to give a hard ointment, while a soft gel and a hard petrolatum will tend to give a soft ointment regardless of the amount of petrolatum used.

For Table I, the petrolatums of consistencies 203 and 239 were prepared by diluting a 195 petrolatum (melting point 110 degrees F.) with roughly 20 or 25 percent of light mineral oil. The petrolatum having consistency of 126 is a commercial, unmodified white petrolatum having a melting point of 135 degrees F. (A. S. T. M. method D-127-30).

The consistency changes slightly upon aging, and during certain operations of packing in containers; but the air-free base continues to have about the same consistency as when originally prepared.

Various specimens of bentonite exhibit these general properties, but differ among themselves as to the consistencies of the gel prepared with a given proportion of water, and with respect to capabilities of emulsifying oils and petroleum jelly at the given proportion. It has been found, however, that the desired consistencies of the ointment can best be attained by selecting the consistency desired (preferably within the limitations of 100 to 275 units, as determined by the A. S. T. M. method for petrolatum, and which includes both soft and firm materials), and then determining a mixture of the selected bentonite and water which has essentially this consistency. It has been found that upon producing the blends of up to 30 percent of a selected petrolatum with the thus-determined proportion of water and bentonite, the consistency of the ointment is essentially the same as that of the gel component. The relative quantities of petrolatum component may thus be varied without essential change in the pre-selected consistency, and thus a proper quantity of petrolatum can be introduced to produce the emollient and solvent qualities without exceeding the limit of washability.

The lower limit of bentonite used in the ointment depends upon the gel-forming and emulsifying properties. With presently available commercial bentonites of high water acceptance, it has been found that about ten percent of bentonite in the ointment is the lowest concentration producing a satisfactory base. In the ointments it is desired to have as high a water content as possible and to avoid large proportions of bentonite which might leave an excessively heavy inorganic residue on the skin after evaporation of the water therefrom, as such a residue would in turn require the presence of a large proportion of petrolatum to prevent the formation of objectionable crusts, flakes or powders. Hence, the upper limit of commercially available bentonites is about 30 percent of the ointment.

The proportion of the petrolatum in the ointment may be adjusted within the limits which determine a satisfactory product. Even small amounts of petrolatum greatly improve the appearance of bentonite gels. But unless present in at least a specific ratio to the bentonite itself, the mixture tends to form crusts or flakes when it dries upon the skin. With commercially available bentonites, excellent bases have been prepared containing 10 percent of petrolatum, and some satisfactory bases have employed lower proportions. The upper limit of the petrolatum likewise depends upon the properties of the bentonite; with commercially available bentonites of high grade, it has been found that the desirable upper limit of petrolatum for a washable three-component ointment is around 30 percent. By introduction of wetting agents, it has been possible to introduce as high as 60 percent of petrolatum for producing ointments of washable type and capable of exhibiting high amounts of oil-soluble medicaments, for example. It is presently preferred to employ a bentonite-petrolatum ratio of about 2:1 for ointments of the type of vanishing creams which are to be rubbed into the skin thoroughly, and a ratio of about 1:2 in the case of preparations which are to be employed as a thick pasty layer to be applied to the skin or exposed internal tissue and remain there for some time, perhaps under a bandage dressing.

The relative consistencies of the ointments, at differing temperatures, have been examined by penetrometer tests, as shown in Table II:

*Table II*

| Temperature | Consistency | |
|---|---|---|
| | Specimen M | Specimen N |
| 30 degrees F | 180 | |
| 33 degrees F | | 179 |
| 80 degrees F | 183 | |
| 82 degrees F | | 202 |
| 143 degrees F | 197 | |
| 158 degrees F | | 274 |

Specimen M was a mixture containing 10 percent of petrolatum while Specimen N contained 30 percent of petrolatum, but these were otherwise of the same constitution. The slight changes between temperatures close to the freezing point of water and room temperature are particularly to be noted. At the higher temperatures, there was some swelling of the ointments, with corresponding exaggeration of the true softening. Such behavior is typically exhibited in simple 3-part mixtures of water, bentonite and petrolatum, and in the more complex mixtures which also include additives (such as 2 percent of cetyl alcohol) or wetting agents (such as ½ or ¾ percent of Duponol).

*Example I*

A bentonite which swelled to an apparent volume of 28 ml. upon the U. S. P. XII test, page 82 (apparent maximum hydration), was mixed with water in the proportion of 17 parts by weight of dry bentonite to 73 parts of water, and stirred vigorously until the mixture was uniform. Ten parts of petrolatum having a melting point of around 110 degrees F. and a consistency of 195 units was introduced, and the material stirred until the mass was a smooth and uniform paste. With this composition, the ratio of water: bentonite is substantially 4:1, the ratio of water-bentonite component to petrolatum component is 9:1, and the ratio of bentonite to petrolatum is 1.7:1.

The paste had a consistency of 159 units at room temperature (80 degrees F.). The color depended upon the originating bentonite and varied from a very light and practically white tint to a dark putty color with the darker varieties of bentonite. This ointment base may be employed directly as an emollient and protective dressing, and also may be used as a base into which may be mixed medicaments, perfume, coloring matter such as dyes or pigments, etc., depending upon the purpose for which the ultimate composition is to be employed.

Owing to the hydrophilic nature of the water-bentonite component and the oily nature of the petrolatum, these additives may be of either hydrous or oily type and introduced to the basic ingredients or to the finished base, and are carried equally well in uniform distribution throughout the pasty base, and are therewith uniformly distributed over the area to which a coating is to be applied. Furthermore, it will be noted that both water-type and oil-type additives may be employed in the same material.

Example II

Thirteen parts by weight of the same bentonite were mixed with 57 parts of water and then 30 parts of petrolatum were added with continuous stirring. In this instance, the ratio of bentonite: water is about 1:4, the ratio of water-bentonite component to petrolatum component is 7:3, and the ratio of bentonite to petrolatum is about 1:2.3.

This ointment base has a consistency of 171 units, and may be used directly or with additives as set out above.

Both of these compositions are creamy in consistency upon completion of the blend, can be spread in the manner of cold cream, and are permanently water-removable. Each composition is an irreversible colloidal dispersion which can be removed by water and light friction. Each is stable even at high and low temperatures (such as minus 50 degrees F. and 250 degrees F.) so that they may be kept under any normal condition and may be sterilized by autoclaving. Each is compatible with a wide variety of drugs, and each contains only bland ingredients.

Example III

A bentonite (Volclay BC) is employed which is essentially grit-free and which swells to an apparent volume between 25 and 30 ml. when tested according to the procedure described in U. S. P. XII, page 82. A mixing machine, for example an ordinary electrical kitchen mixer having a one-quart bowl, is used with 300 grams of water at 60 degrees C. in the mixing bowl. About 30 grams of bentonite are added to the water and the mixture stirred rapidly for about 10 minutes or until a smooth magma results. The temperature drops to about 40 degrees C. 40 grams of white petroleum jelly (melting temperature about 110 degrees F. per A. S. T. M. Designation D-127-30, and penetration of 195 per A. S. T. M. Designation D-127-38T) is melted and brought to a temperature of 45 degrees C. and is added to the mixture over a period of five minutes with constant rapid stirring. The temperature drops below 40 degrees C. At this stage, the mixture appears oily. More bentonite is added slowly with continued beating for about 15 or 20 minutes, to obtain the desired consistency, wherewith the mass loses its oily appearance and becomes quite smooth. In a particular case, 30 grams of bentonite making 60 grams in all, was so added. It is preferred to add an antiseptic or mold preventive such as 0.4 gram of methyl parahydroxybenzoate, by dissolving or suspending in the water or by dissolving in the oil phase.

In this composition, the ratio of water:bentonite is 5:1, the ratio of water-bentonite component to petrolatum component is 9:1, and the ratio of the bentonite to petrolatum is 3:2.

Example IV

The above specific examples set out methods of preparing the mixtures by successive hydration of bentonite, and blending of the hydrophobic component therewith, by continued stirring in a single vessel while successively adding the components to the water. It is also feasible to prepare a large quantity of bentonite gel of a desired consistency, and then introduce desired quantities of the hydrophobic component, with or without prior incorporation of an oil-soluble agent such as a medicament therein.

For example, 9 parts by weight of a gel comprised of 17 parts by weight of dry bentonite (Volclay BC, swelling volume 28 ml. upon U. S. P. XII test) and 73 parts of water, were weighed out and piled on a glass slab. One part by weight of petrolatum (M. P. about 110 degrees F., consistency 195) was weighed and placed on the slab in a separate pile. The petrolatum is then worked with a spatula into an equal volume of the gel, until smooth: the mixture is then worked with the remainder of the gel to attain a smooth uniform paste. This product has essentially the same properties as that of Example I above.

These compositions of the above specific examples can be completed, with or without odorous or medicinal additives, and then packaged and subjected to sterilization by placing the composition in hermetically-sealed containers and heating the containers to a temperature of 121 degrees C. or 250 degrees F., for example in a steam autoclave under 15-pounds pressure for a sufficient length of time which depends upon the size of the container, the method of packing the containers in the autoclave, etc., and may be determined by bacteriological supervision. It has also been found possible to attain a satisfactory commercial sterility for cold creams, etc., by previously heating the dry bentonite itself in shallow trays for at least two hours at 170 degrees C. or 338 degrees F., and protecting against later contamination, and by mixing therewith the other ingredients in sterile form, wherewith it may be noted that the preparation of petrolatum involves such conditions that it likewise is sterile if protected against contamination.

It is feasible to prepare ointment bases by using mixtures of hydrophobic or greasy substances, such as mixtures of petroleum jelly, lard, cetyl alcohol, lanolin, glyceryl monostearate, etc., and such compositions are of high value in instances where a particular oily-type additive is not effectively dispersed in petrolatum alone.

It is obvious that the invention is not limited to the illustrative examples, but that it may be practiced in many ways within the scope of the appended claims.

What is claimed is:

1. A water removable and stable plastic ointment base consisting substantially of an emulsion of a bentonite gel and a hydrophobic grease, with the bentonite gel providing the continuous phase and being an aqueous gel of a bentonite having a swelling power in excess of substantially 11 ml. upon U. S. P. XII test; said base comprising substantially 10 to 30 percent of the bentonite, 10 to 30 percent of the grease, and the remainder water, and characterized in having and maintaining an A. S. T. M. consistency (petrolatum test) of 100 to 275 units between room temperature and plus 150 degrees F., in remaining stable and capable of removal by water after undergoing exposure to temperature of minus 40 degrees F. to plus 250 degrees F. and in having no critical temperature between its freezing point and plus 250 degrees F.

2. A water removable and stable plastic ointment base consisting substantially of an emulsion of a bentonite gel and a hydrophobic grease comprising petroleum jelly for at least a major part thereof, with the bentonite gel providing the continuous phase and being an aqueous gel of a bentonite having a swelling power in excess of substantially 11 ml. upon U. S. P. XII test, said base comprising substantially 10 to 30 parts of the bentonite, 10 to 30 parts of the grease, the ratio of bentonite to grease being between 2:1 and 1:2, and water in quantity sufficient to form with the bentonite a gel having an A. S. T. M. consistency (petrolatum test) of 100 to 275 units, and characterized in having and maintaining an A. S. T. M. consistency (petrolatum test) of 100 to 275 units between room temperature and plus 150 degrees F., in remaining stable and capable of removal by water after undergoing exposure to temperature of minus 40 degrees F. to plus 250 degrees F. and in having no critical temperature between its freezing point and plus 250 degrees F.

3. Water removable and stable plastic ointment base consisting substantially of an emulsion of a bentonite gel and petroleum jelly, with the bentonite gel providing a continuous phase and being an aqueous gel of a bentonite having a swelling power in excess of substantially 11 ml. upon U. S. P. XII test, and containing 10 to 30 percent of bentonite in water, from 10 to 30 parts of the petroleum jelly being present as the discontinuous phase in 90 to 70 parts of the bentonite gel, and characterized in having and maintaining an A. S. T. M. consistency (petrolatum test) of 100 to 275 units between room temperature and plus 150 degrees F., in remaining stable and capable of removal by water after undergoing exposure to temperatures of minus 40 degrees F. to plus 250 degrees F. and in having no critical temperature between its freezing point and plus 250 degrees F.

4. The method of forming a water-removable ointment from bentonite, water and a hydrophobic grease and having a predetermined consistency, which comprises mixing the bentonite and water to form a bentonite gel having the selected consistency, and then mixing therewith and distributing therein the hydrophobic grease and forming an emulsion in which the bentonite gel provides the continuous phase; the base comprising substantially 10 to 30 percent of a bentonite having a swelling power in excess of substantially 11 ml. upon U. S. P. XII test, 10 to 30 percent of grease, and the remainder water.

5. The method of forming a water-removable acid medicinal ointment from bentonite, water and petroleum jelly and having a predetermined consistency, which comprises mixing the bentonite and water to form a bentonite gel having the selected consistency, and then mixing therewith and distributing therein the petroleum jelly and the acid medicament establishing a base in the form of an emulsion containing the medicament and in which the bentonite gel provides the continuous phase; the base comprising substantially 10 to 30 percent of a bentonite having a swelling power in excess of substantially 11 ml. upon U. S. P. XII test, 10 to 30 percent of petroleum jelly, and the remainder water.

6. A water removable and stable plastic ointment base consisting substantially of an emulsion of a bentonite gel and petroleum jelly, with the bentonite gel providing a continuous phase and being an aqueous gel of a bentonite having a swelling power in excess of substantially 11 ml. upon U. S. P. XII test, and containing substantially 13 parts of dry bentonite and substantially 57 parts of water, about 30 parts of petroleum jelly being present as the discontinuous phase, said petroleum jelly having an A. S. T. M. consistency (petrolatum test) of 100 to 275 units and having a melting point between substantially 110 degrees F. and 135 degrees F.; the ointment base being characterized in having and maintaining an A. S. T. M. consistency (petrolatum test) of 100 to 275 units between room temperature and plus 150 degrees F., in remaining stable and capable of removal by water after undergoing exposure to temperatures of minus 40 degrees F. and plus 250 degrees F. and in having no critical temperature between its freezing point and plus 250 degrees F.

7. A water removable and stable plastic ointment base consisting substantially of an emulsion of a bentonite gel and petroleum jelly, with the bentonite gel providing a continuous phase and being an aqueous gell of a bentonite having a swelling power in excess of substantially 11 ml. upon U. S. P. XII test, and containing 17 parts by weight of dry bentonite and substantially 73 parts of water, about 10 parts of petroleum jelly being present as the discontinuous phase, said petroleum jelly having an A. S. T. M. consistency (petrolatum test) of 100 to 275 units and having a melting point between substantially 110 degrees F. and 135 degrees F.; the ointment base being characterized in having and maintaining an A. S. T. M. consistency (petrolatum test) of 100 to 275 units between room temperature and plus 150 degrees F., in remaining stable and capable of removal by water after undergoing exposure to temperatures of minus 40 degrees F. and plus 250 degrees F. and in having no critical temperature between its freezing point and plus 250 degrees F.

WILLIAM S. McCLENAHAN.
HARRY A. NELSON.

REFERENCES CITED

The following references are of record in the file of this patent:

UNITED STATES PATENTS

| Number | Name | Date |
|---|---|---|
| 1,515,777 | Olsson | Dec. 2, 1924 |
| 2,409,338 | Alton et al. | Oct. 15, 1946 |

OTHER REFERENCES

Lesser, The Drug and Cosmetic Industry, Oct. 1941, pages 390–393.

Jour. Amer. Phar. Assn. Practical Pharm. Ed. 2, pages 78 and 79 (1941).

Amer. Prof. Pharmacist, June 1942, page 355.